(12) United States Patent
Varnica et al.

(10) Patent No.: US 11,748,418 B2
(45) Date of Patent: Sep. 5, 2023

(54) STORAGE AGGREGATOR CONTROLLER WITH METADATA COMPUTATION CONTROL

(71) Applicant: Marvell International Ltd., Hamilton (BM)

(72) Inventors: Nedeljko Varnica, San Jose, CA (US); Scott Furey, Cupertino, CA (US); Manish Shrivastava, Pleasanton, CA (US); Noam Mizrahi, Modi'in (IL)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/264,248

(22) Filed: Jan. 31, 2019

(65) Prior Publication Data

US 2020/0045110 A1  Feb. 6, 2020

Related U.S. Application Data

(60) Provisional application No. 62/726,852, filed on Sep. 4, 2018, provisional application No. 62/726,847, filed
(Continued)

(51) Int. Cl.
*G06F 12/1045* (2016.01)
*G06F 15/173* (2006.01)
(Continued)

(52) U.S. Cl.
CPC .......... *G06F 16/907* (2019.01); *G06F 3/0604* (2013.01); *G06F 3/068* (2013.01);
(Continued)

(58) Field of Classification Search
CPC ...... G06F 16/907; G06F 3/0659; G06F 3/068; G06F 12/1054; G06F 15/17331;
(Continued)

(56) References Cited

U.S. PATENT DOCUMENTS 6,012,068 A  1/2000  Boezeman
6,215,749 B1  4/2001  Kim
(Continued)

FOREIGN PATENT DOCUMENTS

EP  3244347  11/2017
JP  2004159331 A  6/2004
(Continued)

OTHER PUBLICATIONS

Y. Kang, Y. Kee, E. L. Miller and C. Park, "Enabling cost-effective data processing with smart SSD," 2013 IEEE 29th Symposium on Mass Storage Systems and Technologies (MSST), 2013, pp. 1-12, doi: 10.1109/MSST.2013.6558444. (Year: 2013).*
(Continued)

*Primary Examiner* — Hitesh Patel
*Assistant Examiner* — Alex H. Tran

(57) ABSTRACT

This disclosure describes a storage aggregator controller with metadata computation control. The storage aggregator controller communicates, via a host interface, over a computer network with one or more remote hosts, and also communicates, via a storage device interface, with a plurality of local storage devices, which are separate from the remote host(s) and which have respective non-volatile memories. The storage aggregator controller manages the local storage devices for storage or retrieval of media objects. The storage aggregator controller also governs a selective computation, at aggregator control circuitry or at a storage device controller of one or more of the storage devices, of metadata that defines content characteristics of the media objects that are retrieved from the plurality of storage devices or that are received from the one or more hosts over the computer network for storage in the plurality of storage devices.

20 Claims, 4 Drawing Sheets

Related U.S. Application Data on Sep. 4, 2018, provisional application No. 62/716,269, filed on Aug. 8, 2018, provisional application No. 62/714,563, filed on Aug. 3, 2018, provisional application No. 62/712,823, filed on Jul. 31, 2018.

(51) Int. Cl.

| | | |
|---|---|---|
| *H04L 49/901* | (2022.01) | |
| *H04L 67/1097* | (2022.01) | |
| *G06F 16/907* | (2019.01) | |
| *G06F 16/901* | (2019.01) | |
| *G06F 16/9038* | (2019.01) | |
| *G06F 16/9035* | (2019.01) | |
| *G06F 16/783* | (2019.01) | |
| *G06F 16/387* | (2019.01) | |
| *G06F 16/683* | (2019.01) | |
| *G06F 16/383* | (2019.01) | |
| *G06F 3/06* | (2006.01) | |
| *G06N 3/08* | (2023.01) | |

(52) U.S. Cl.
CPC .......... *G06F 3/0638* (2013.01); *G06F 3/0659* (2013.01); *G06F 3/0688* (2013.01); *G06F 12/1054* (2013.01); *G06F 15/17331* (2013.01); *G06F 16/383* (2019.01); *G06F 16/387* (2019.01); *G06F 16/683* (2019.01); *G06F 16/783* (2019.01); *G06F 16/901* (2019.01); *G06F 16/9035* (2019.01); *G06F 16/9038* (2019.01); *G06N 3/08* (2013.01); *H04L 49/901* (2013.01); *H04L 67/1097* (2013.01); *G06F 2212/254* (2013.01)

(58) Field of Classification Search
CPC .... G06F 16/783; G06F 16/387; G06F 16/683; G06F 16/383; G06F 3/0604; G06F 3/0638; G06F 3/0688; G06F 16/901; G06F 16/9038; G06F 16/9035; G06F 2212/254; G06F 16/41; H04L 49/901; H04L 67/1097; G06N 3/08
See application file for complete search history.

(56) References Cited

U.S. PATENT DOCUMENTS

| | | | |
|---|---|---|---|
| 7,127,120 B2 | 10/2006 | Hua et al. | |
| 7,574,054 B2 | 8/2009 | Gallagher et al. | |
| 7,788,592 B2 | 8/2010 | Williams et al. | |
| 7,801,910 B2 | 9/2010 | Houh et al. | |
| 7,979,478 B2 | 7/2011 | Hiraiwa et al. | |
| 8,938,492 B1 | 1/2015 | Kelly | |
| 9,451,329 B2 | 9/2016 | Whitman et al. | |
| 9,465,892 B2 | 10/2016 | Shamma | |
| 9,639,564 B2 | 5/2017 | Isherwood et al. | |
| 9,639,969 B1 | 5/2017 | Wilson | |
| 9,966,112 B1 | 5/2018 | Kulkarni et al. | |
| 10,129,109 B2* | 11/2018 | Jayanti Venkata | .... H04L 47/125 |
| 10,860,508 B2* | 12/2020 | Bolkhovitin | ........ G06F 13/1668 |
| 10,884,996 B1 | 1/2021 | Suresh et al. | |
| 10,963,393 B1 | 3/2021 | Ben-Yehuda et al. | |
| 11,036,807 B2 | 6/2021 | Mizrahi | |
| 11,221,939 B2 | 1/2022 | Degaonkar et al. | |
| 2004/0143590 A1 | 7/2004 | Wong | |
| 2005/0055406 A1 | 3/2005 | Singhai et al. | |
| 2006/0047706 A1* | 3/2006 | Castro | ................... G06F 16/907 |
| 2006/0242178 A1 | 10/2006 | Butterfield et al. | |
| 2006/0274949 A1 | 12/2006 | Gallagher et al. | |
| 2007/0038647 A1 | 2/2007 | Thomas | |
| 2007/0078896 A1 | 4/2007 | Hayashi et al. | |
| 2007/0156726 A1* | 7/2007 | Levy | .................... H04N 21/252 |
| 2008/0195664 A1 | 8/2008 | Maharajh et al. | |
| 2008/0304747 A1 | 12/2008 | Marinkovich et al. | |
| 2009/0077561 A1* | 3/2009 | Feng | ..................... G06F 9/5066 |
| | | | 718/104 |
| 2009/0132462 A1* | 5/2009 | Szabo | ..................... G06F 16/48 |
| 2009/0216719 A1 | 8/2009 | Coffman et al. | |
| 2010/0177938 A1 | 7/2010 | Martinez et al. | |
| 2010/0179874 A1 | 7/2010 | Higgins et al. | |
| 2011/0235858 A1 | 9/2011 | Hanson et al. | |
| 2011/0289094 A1 | 11/2011 | Fisher | |
| 2012/0265735 A1 | 10/2012 | McMillan et al. | |
| 2012/0278560 A1* | 11/2012 | Benzion | .............. G06F 12/0862 |
| | | | 711/137 |
| 2012/0278705 A1 | 11/2012 | Yang et al. | |
| 2013/0097172 A1 | 4/2013 | McIntosh | |
| 2013/0170813 A1 | 7/2013 | Woods et al. | |
| 2013/0289991 A1 | 10/2013 | Eshwar et al. | |
| 2013/0297652 A1 | 11/2013 | Higgins et al. | |
| 2014/0047188 A1* | 2/2014 | Xia | ..................... H04L 67/5682 |
| | | | 711/133 |
| 2014/0074836 A1 | 3/2014 | Adams et al. | |
| 2014/0074855 A1* | 3/2014 | Zhao | .................. H04N 21/8456 |
| | | | 707/746 |
| 2014/0122427 A1 | 5/2014 | Dary | |
| 2014/0250256 A1 | 9/2014 | Duran | |
| 2014/0270407 A1* | 9/2014 | Balakrishnan | ......... G06V 20/30 |
| | | | 382/118 |
| 2015/0016691 A1 | 1/2015 | Anbalagan et al. | |
| 2015/0074476 A1 | 3/2015 | Kim | |
| 2015/0156263 A1 | 6/2015 | Clayton et al. | |
| 2016/0036882 A1 | 2/2016 | Jin et al. | |
| 2016/0170871 A1 | 6/2016 | Hyun et al. | |
| 2016/0191591 A1 | 6/2016 | Rider | |
| 2016/0335339 A1 | 11/2016 | Venkataraman et al. | |
| 2016/0378402 A1 | 12/2016 | Amidi et al. | |
| 2017/0094341 A1 | 3/2017 | Berner et al. | |
| 2017/0169358 A1* | 6/2017 | Choi | ...................... G06N 20/00 |
| 2017/0185869 A1 | 6/2017 | Dua et al. | |
| 2017/0192860 A1* | 7/2017 | Vijayan | .................. G06F 3/0632 |
| 2017/0193362 A1* | 7/2017 | Cremer | .................... G06N 3/04 |
| 2017/0199886 A1 | 7/2017 | Perrine | |
| 2017/0206030 A1* | 7/2017 | Woo | ..................... G06F 12/1408 |
| 2017/0293431 A1* | 10/2017 | Dor | ....................... G06F 3/0605 |
| 2017/0304732 A1* | 10/2017 | Velic | ..................... A63F 13/213 |
| 2017/0331893 A1 | 11/2017 | Crofton et al. | |
| 2018/0004213 A1 | 1/2018 | Absmeier et al. | |
| 2018/0024770 A1* | 1/2018 | Lee | ....................... G06F 3/0688 |
| | | | 711/165 |
| 2018/0033208 A1 | 2/2018 | Martin | |
| 2018/0046869 A1 | 2/2018 | Cordell et al. | |
| 2018/0157421 A1 | 6/2018 | Brown et al. | |
| 2018/0189615 A1* | 7/2018 | Kang | ...................... G06N 3/08 |
| 2018/0307609 A1 | 10/2018 | Qiang et al. | |
| 2018/0329786 A1* | 11/2018 | Gokhale | ............. G06F 11/1435 |
| 2019/0065054 A1* | 2/2019 | Park | ....................... G06F 3/0679 |
| 2019/0138617 A1 | 5/2019 | Farre Guiu et al. | |
| 2019/0278704 A1* | 9/2019 | Lee | ......................... G06F 3/064 |
| 2020/0042888 A1 | 2/2020 | Yu et al. | |
| 2020/0312052 A1 | 10/2020 | Bonnevay et al. | |
| 2020/0364953 A1 | 11/2020 | Simoudis | |
| 2020/0402328 A1 | 12/2020 | Westlund | |
| 2021/0241177 A1 | 8/2021 | Wang et al. | |
| 2021/0263969 A1 | 8/2021 | Sun et al. | |
| 2021/0279603 A1 | 9/2021 | Teran Matus et al. | |
| 2022/0161815 A1 | 5/2022 | Van Beek et al. | |

FOREIGN PATENT DOCUMENTS

| | | |
|---|---|---|
| JP | 2006195970 A | 7/2006 |
| JP | 2008192102 A | 8/2008 |
| JP | 2008204193 A | 9/2008 |
| JP | 2008543224 A | 11/2008 |
| JP | 2010039966 A | 2/2010 |
| JP | 2012221322 A | 11/2012 |
| JP | 2014241045 A | 12/2014 |
| JP | 2016512634 A | 4/2016 |
| JP | 2016143352 A | 8/2016 |
| WO | 2014170953 A1 | 10/2014 |

(56) References Cited

FOREIGN PATENT DOCUMENTS

| WO | 2017091282 A1 | 6/2017 |
| WO | 2018102919 A1 | 6/2018 |
| WO | 2021114608 A1 | 6/2021 |

OTHER PUBLICATIONS

M. Mishra, A. K. Somani, "On-Disk Data Processing: Issues and Future Directions," arXiv, 2017, doi: 10.48550/ARXIV.1709.02718. (Year: 2017).*

International Search Report and Written Opinion in PCT/US2019/044558 dated Dec. 12, 2019.

IEEE Std 802.3ch-2020, "IEEE Standard for Ethernet, Amendment 8: Physical Layer Specifications and Management Parameters for 2.5 Gb/s, 5 Gb/s and 10 Gb/s Automotive Electrical Ethernet", pp. 1-207, Jun. 4, 2020.

IEEE Std 802.3bp-2016, "IEEE Standard for Ethernet, Amendment 4: Physical Layer Specifications and Management Parameters for 1 Gb/s Operation over a Single Twisted-Pair Copper Cable", pp. 1-211, Jun. 30, 2016.

IEEE Std 802.3bw-2015, "IEEE Standard for Ethernet, Amendment 1: Physical Layer Specifications and Management Parameters for 100 Mb/s Operation over a Single Balanced Twisted Pair Cable (100BASE-T1)", pp. 1-88, Oct. 26, 2015.

IEEE Std 802.3cg-2019, "IEEE Standard for Ethernet, Amendment 5: Physical Layers Specifications and Management Parameters for 10 Mb/s Operation and Associated Power Delivery over a Single Balanced Pair of Conductors", pp. 1-256, Nov. 7, 2019.

"Anonymous: ""Idle (CPU)—Wikipedia""", May 1, 2018 (May 1, 2018), XP55873737, Retrieved from the Internet: URL: https://en.wikipedia.org/w/index.php?title=Idle_(CPU)&oldid=839126219 [retrieved on Dec. 16, 2021]".

* cited by examiner

STORAGE AGGREGATOR CONTROLLER WITH METADATA COMPUTATION CONTROL

CROSS-REFERENCE TO RELATED APPLICATIONS

This disclosure claims the benefit under 35 U.S.C. § 119(e) of copending, commonly-assigned United States Provisional Patent Applications Nos. 62/712,823, filed Jul. 31, 2018; 62/714,563, filed Aug. 3, 2018; 62/716,269, filed Aug. 8, 2018; 62/726,847, filed Sep. 4, 2018; and 62/726,852, filed Sep. 4, 2018. Each of the following commonly-assigned United States nonprovisional patent applications also claims the benefit of the aforementioned United States provisional patent applications, and is being filed concurrently herewith:
 1. U.S. patent application Ser. No. 16/263,387;
 2. U.S. patent application Ser. No. 16/264,473;
 3. U.S. patent application Ser. No. 16/262,975; and
 4. U.S. patent application Ser. No. 16/262,971.
Each of the aforementioned provisional and nonprovisional patent applications is hereby incorporated by reference herein in its respective entirety.

FIELD OF USE

This disclosure relates to storage control and generation at the storage edge of metadata for stored content data, and specifically, to a storage aggregator controller that, in addition to managing the storage and retrieval of data in an array of local storage devices, additionally computes metadata characterizing data that is stored or that is to be stored.

BACKGROUND OF THE DISCLOSURE

The background description provided herein is for the purpose of generally presenting the context of the disclosure. Work of the inventors hereof, to the extent the work is described in this background section, as well as aspects of the description that do not otherwise qualify as prior art at the time of filing, are neither expressly nor impliedly admitted to be prior art against the present disclosure.

Existing storage systems often store unstructured data, such as video, sound recordings and sensor data, with associated metadata that provides a description or a meaning of the unstructured data in a compact format. Common formats of the metadata include various labels, tags, data type indicators, objects and activities detected in the data, location where the data was created, and the like. Oftentimes, metadata is conventionally generated by a host system, such as a data center, interacting remotely over a computer network with an existing storage system, such as a storage server at which the data is stored. For example, the storage system is configured to retrieve stored unstructured content media from a non-volatile memory at a storage center and send the retrieved data to the host system via a host interface or computer network. The host system can then analyze the obtained data, for example using powerful artificial intelligence tools, and generate metadata relating to the obtained data. However, the volume of unstructured data that require metadata generation can be vast and scanning and analyzing a vast volume of unstructured data to generate metadata is a costly process that consumes many processing instruction cycles (e.g., central processing unit (CPU) cycles). Additionally, even after the metadata has been generated, the metadata is then passed back over the host interface or computer network to the remote storage system for storage. The volume of data and/or metadata exchanged over a computer network between the remote storage and host systems can be significant, thus negatively impacting available bandwidth of computer processing and networking systems. As a result, it is practically impossible to generate metadata for substantial volumes of media that are generated in today's world.

SUMMARY

Embodiments described herein provide a storage aggregator controller with metadata computation control. In one aspect, a storage aggregator controller comprises a host interface, a storage device interface, and aggregator control circuitry. The host interface is configured to communicate over a computer network with one or more remote hosts. The storage device interface is configured to communicate locally with a plurality of local storage devices, which have respective non-volatile memories, are separate from the one or more remote hosts, and are coupled to the storage device interface. The aggregator control circuitry is configured to manage the plurality of local storage devices for storage or retrieval of media objects. As an example, the aggregator control circuitry is configured to present to the one or more remote hosts an abstracted logical address space that is mapped to a combination of physical address spaces of the plurality of storage devices, with the mapping of the abstracted logical address space to the physical address spaces being adjustable. The aggregator control circuitry is also configured to govern a selective computation, at the aggregator control circuitry or at a storage device controller of one or more of the storage devices, of metadata that defines content characteristics of the media objects that are retrieved from the plurality of storage devices or that are received from the one or more hosts over the computer network for storage in the plurality of storage devices.

In another aspect, the aggregator control circuitry is further configured to control an order by which media objects are retrieved from the plurality of storage devices and processed to compute metadata.

In a further aspect, the aggregator control circuitry is further configured to selectively control whether the metadata is computed by the storage device controller of any single storage device, by storage device controllers of a plurality of storage devices, or by a combination of the aggregator control circuitry and storage device controllers of one or more storage devices.

In yet another aspect, the aggregator control circuitry is further configured to cause the storage device controller of a specific storage device, from among the plurality of storage devices, to compute metadata with respect to a segment of a media object that is stored in the specific storage device.

In one embodiment, the aggregator control circuitry is further configured to identify an idle storage device controller of one or more storage devices that is presently not busy executing a storage related read operation or write operation, and select the identified idle storage device controller to compute metadata based on media objects or media object segments stored in one or more of the plurality of storage devices.

As another example, the aggregator control circuitry is further configured to apportion a processing load for computing metadata of media objects among the aggregator control circuitry and storage device controllers of one or more of the plurality of storage devices.

In a further aspect, a media object is stored in segments distributed among respective ones of the plurality of storage devices. In such an aspect, the aggregator control circuitry is further configured to cause a plurality of storage device controllers of the plurality of storage devices, respectively, to compute portions of metadata for the segments of the media object that are stored locally at the respective storage device, and store the portions of computed metadata at the respective storage device. The aggregator control circuitry obtains the computed portions of metadata from the plurality of storage devices and combines the computed portions of metadata into combined metadata corresponding to the media object.

As another example, the aggregator control circuitry is further configured to retrieve segments of a media object from separate storage devices from among the plurality of storage devices that are aggregated by the storage aggregator controller and compute metadata for the retrieved segments of the media object.

In one embodiment, the aggregator control circuitry is further configured to cause computed metadata to be stored in separate segments distributed among the plurality of storage devices.

In another embodiment, the aggregator control circuitry is further configured to receive a read instruction or a write instruction from the one or more hosts over the computer network and, in response to the receiving, pause metadata computation at one or more of the aggregator control circuitry and storage device controller to which the read or write instruction is targeted, and continue metadata computation at least at the aggregator control circuitry or at a storage controller that is controlled by the aggregator control circuitry and that is idle from performing any read or write instructions.

In another aspect, a method for managing local storage devices and metadata computation is provided. The method comprises communicating, via a host interface, over a computer network with one or more remote hosts. A storage aggregator controller communicates, via a storage device interface, locally with a plurality of local storage devices, which are separate from the one or more remote hosts, which have respective non-volatile memories, and which are coupled to the storage device interface. The storage aggregator controller manages the plurality of local storage devices for storage or retrieval of media objects. As one example, the storage aggregator controller presents to the one or more remote hosts an abstracted logical address space that is mapped to a combination of physical address spaces of the plurality of storage devices, with the mapping of the abstracted logical address space to the physical address spaces being adjustable. The storage aggregator controller also governs a selective computation, at aggregator control circuitry or at a storage device controller of one or more of the storage devices, of metadata that defines content characteristics of the media objects that are retrieved from the plurality of storage devices or that are received from the one or more hosts over the computer network for storage in the plurality of storage devices.

In another aspect, the method further comprises controlling an order by which media objects are retrieved from the plurality of storage devices and processed to compute metadata.

In a further aspect, the method further comprises selectively controlling whether the metadata is computed by the storage device controller of any single storage device, by storage device controllers of a plurality of storage devices, or by a combination of the aggregator control circuitry and storage device controllers of one or more of the storage devices.

In yet another aspect, the method further comprises causing the storage device controller of a specific storage device, from among the plurality of storage devices, to compute metadata with respect to a segment of a media object that is stored in the specific storage device.

In one embodiment, the method further comprises identifying an idle storage device controller of one or more storage devices that is presently not busy executing a storage related read operation or write operation and selecting the identified idle storage device controller to compute metadata based on media objects or media object segments stored in one or more of the plurality of storage devices.

As another example, the method further comprises apportioning a processing load for computing metadata of media objects among the aggregator control circuitry and storage device controllers of one or more of the plurality of storage devices.

In a further aspect, a media object is stored in segments distributed among respective ones of the plurality of storage devices. In such an aspect, the method further comprises causing a plurality of storage device controllers of the plurality of storage devices, respectively, to compute portions of metadata for the segments of the media object that are stored locally at the respective storage device, and to store the portions of computed metadata at the respective storage device. The storage aggregator controller obtains the computed portions of metadata from the plurality of storage devices and combines the computed portions of metadata into combined metadata corresponding to the media object.

In a further aspect, the method further comprises retrieving segments of a media object from separate storage devices from among the plurality of storage devices that are aggregated by the storage aggregator controller; and computing metadata for the retrieved segments of the media object.

As another example, the method further comprises causing computed metadata to be stored in separate segments distributed among the plurality of storage devices.

In a further embodiment, the method further comprises receiving a read instruction or a write instruction from the one or more hosts over the computer network and, in response to the receiving, pausing metadata computation at one or more of the aggregator control circuitry and storage device controller to which the read or write instruction is targeted, and continuing metadata computation at least at the aggregator control circuitry or at a storage controller that is controlled by the aggregator control circuitry and that is idle from performing any read or write instructions.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

Figure 1:
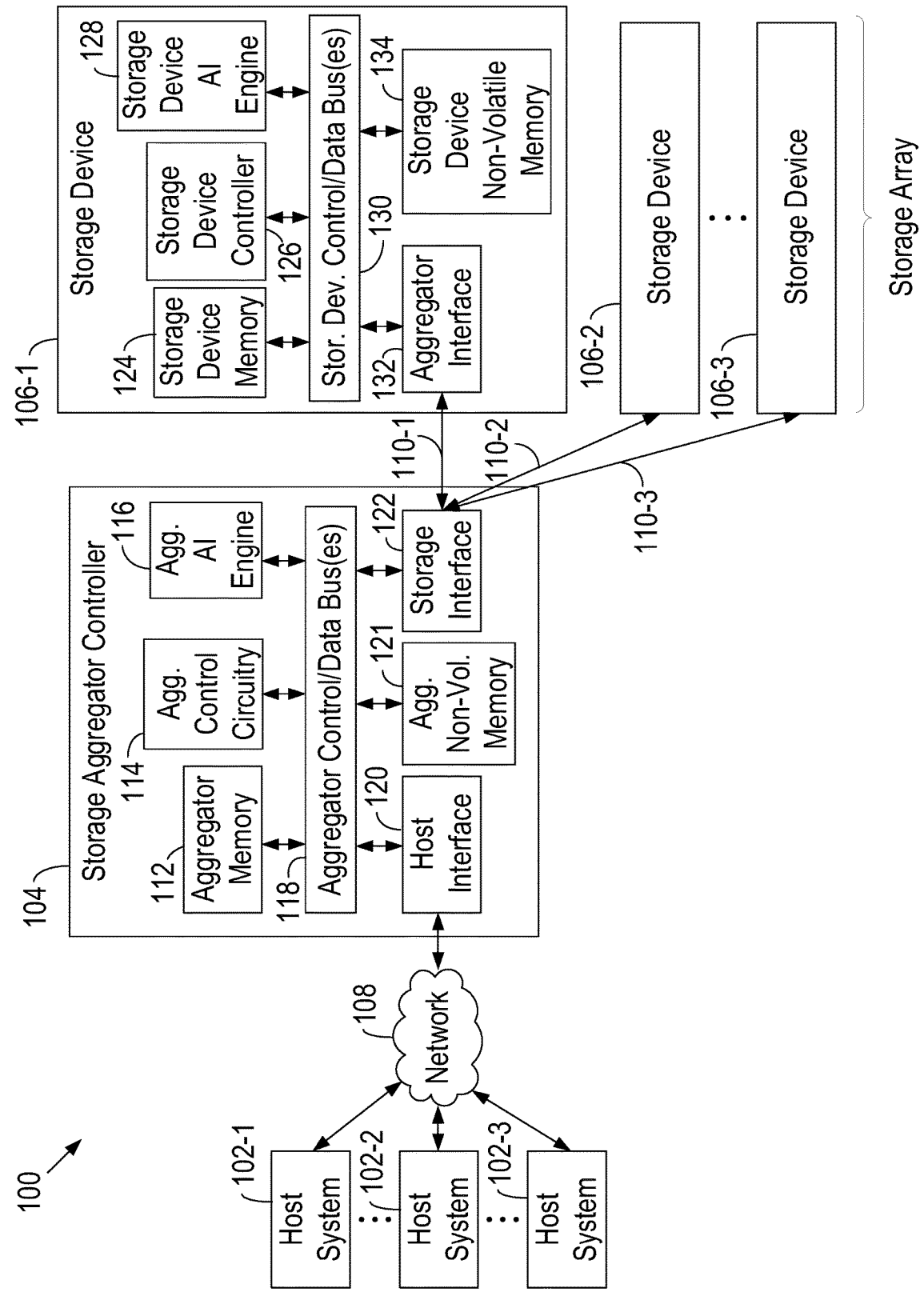
FIG. 1 is a schematic representation of a system for controlling metadata computation using a storage aggregator controller in accordance with some embodiments of the subject matter of this disclosure.

In view of the inefficiency of conventional metadata computation at the host system, in accordance with implementations described herein metadata for unstructured media is computed using computational resources of a storage aggregator controller and/or of a storage device. Computation of metadata for unstructured media at the storage edge eliminates the need to transmit massive volumes of data between a storage device and a remote host system in order to generate metadata, decreases utilization of host processing resources (such as CPUs), decreases the latency between initiating a data request for generating metadata and retrieval of the requested data from a storage device, decreases power consumption of host systems, increases utilization of often idle resources (for example, storage aggregator controllers and/or storage device controllers) at the storage edge, and improves scalability (for instance, for use in a big data context). Specifically, embodiments described herein provide one or more computational engines (such as an artificial intelligence (AI) engine) disposed within a storage aggregator controller that is coupled to an array of non-volatile storage devices and/or with one or more storage controllers of the storage devices to implement metadata generation for unstructured media. In this way, the storage aggregator controller and/or the storage devices themselves generate metadata locally (relative to where content data is stored), e.g., via one or more internal computational engines residing within the storage aggregator controller and/or the storage controller, without transferring unstructured media data content over a computer network to remotely located host computational systems for processing. Remotely located hosts include hosts that are located remotely from the storage devices. For instance, in some examples, remotely located hosts are located on servers that are separated by some distance from the storage devices, which themselves are located on different servers, on different racks, and/or at different data center locations. Accordingly, the throughput of metadata generation is neither limited by the data capacity of the host interface of the storage device, by bandwidth limitations of a computer network connection, nor by any latency implications caused by remote distances between hosts systems and the storage device locations at which data is stored. Moreover, the efficiency of the storage device is improved.

As used herein, the terms "data objects," "media objects," or "objects" are used to mean various types of data that are issued by an application running on a host system and that can be stored on a storage device. Examples of "media objects" or "objects" include but are not limited to videos, sound recordings, still images, textual objects such as text messages and e-mails, data obtained from various types of sensors such as automotive sensors and Internet-of-Things (IoT) sensors, database objects, and/or any other suitable objects. In many cases, the media objects are unstructured. As used herein, the term "unstructured object" means that the media content of the object (e.g., textual content, audio content, image content or video content) is provided in raw form and is not organized in advance according to a fixed field format. An unstructured object is not tagged a-priori with metadata that defines any aspects of the content per frame or other content portion. Unstructured data is non-transactional, and its format does not readily conform to a relational database schema.

As used herein, the term storage edge is used to mean a module or component that is local to a non-volatile storage device. For example, a controller that controls the operation of one or more storage devices to store or retrieve data at one or more instances of a non-volatile memory is disposed on a storage edge. The storage edge is found, for example, in dedicated storage devices or at storage networks and is separated from a processor that is remotely located, for instance in a host computer or at a data center. Communication between the storage edge and a remote host is over a computer network connection.

As used herein, the term "metadata" refers to a high-level representation of the actual data content stored in a non-volatile storage device. The "metadata" can be an abstraction layer of the actual data content, which gives a description or a meaning of data content in a compact format. Metadata can be generated from media objects, which are often unstructured, in various ways. Example metadata can include labels, tags, types of data, objects/concepts/sentiments detected in data content, spatial/temporal locations of such objects/concepts/sentiments within the data content, etc.

As used herein, the term "artificial intelligence (AI) model" is used to refer to any suitable AI algorithm, e.g., implemented on a deep neural network or any recurrent neural network or any variation of those. In some implementations, an AI model is suitably any other supervised learning algorithm, unsupervised learning algorithm, or reinforcement learning algorithm. For implementations in which the AI model is a supervised learning algorithm, the AI model is trained using a "training set"—a body of media objects and corresponding metadata that is known to be accurate. The trained supervised AI model is then applied to generate metadata for other media objects. A software or hardware module that receives an AI model, such as a trained AI model, and uses it to compute metadata of objects is referred to herein as an "AI engine" or "AI inference engine." In some implementations, several different AI models will be applied to unstructured or partially structured media objects.

FIG. 1 is a representation of system 100 for controlling metadata computation using storage aggregator controller 104 in accordance with some embodiments of the subject matter of this disclosure. System 100 includes one or more host systems 102-1, 102-2, 102-3 (collectively host systems 102), storage aggregator controller 104, and an array of storage devices 106-1, 106-2, 106-3 (collectively storage devices 106). Although FIG. 1 illustrates three host systems 102 and three storage devices 106, system 100 includes other suitable numbers (1, 2, 3, 4, 5, etc.) of host systems 102 and/or storage devices 106 in other embodiments. Host systems 102 are remote from storage aggregator controller 104 and storage devices 106 and are communicatively coupled to storage aggregator controller 104 via computer network 108 and host interface 120. In some embodiments, for instance, storage aggregator controller 104 and storage devices 106 are disposed in a storage server or in a network-attached storage server that is located some distance from remote host systems 102, with host systems 102 being located in one or more data centers which themselves are also located remotely from one another.

Storage aggregator controller 104 is communicatively coupled to multiple storage devices 106-1, 106-2, 106-3 via respective storage device interfaces 122 (sometimes referred to as storage interface) and local communication paths 110-1, 110-2, 110-3 (collectively local communication paths 110), such as a serial attached small computer system interface (SAS), a serial ATA interface, a peripheral component interconnect express (PCIe) interface, a cloud protocol, a protocol for a storage area network, or the like.

Storage aggregator controller 104 includes aggregator memory 112, aggregator control circuitry 114, aggregator AI engine 116, host interface 120, and storage interface 122. These components are communicatively coupled to one another via one or more aggregator control/data buses 118.

Although FIG. 1 shows aggregator AI engine 116 as being situated within storage aggregator controller 104, in other embodiments, aggregator AI engine 116 is situated separately from, but local to, storage aggregator controller 104. For example, in some embodiments where storage aggregator controller 104 is implemented as a system-on-chip (SoC), AI engine is implemented as an off-chip peripheral component, such as an FPGA, a separate computational device specifically configured for digital signal processing, a vector processing engine, or a graphics processing unit (GPU), that is locally communicatively coupled to storage aggregator controller 104, for instance, via a PCIe interface, a Ethernet interface, or any other suitable high-speed interface.

Aggregator control circuitry 114, in embodiments, is configured to execute processor-executable instructions, for example firmware instructions, that are stored in aggregator non-transitory memory 121. In general, aggregator control circuitry 114 manages local storage devices 106, which are coupled to storage device interface 122 via aggregator interface 132 and local communication paths 110, for storage or retrieval of media objects. As part of such management, in an embodiment, aggregator control circuitry 114 presents to the one or more remote hosts 102 an abstracted logical address space that is mapped to a combination of at least a portion of physical address spaces of multiple of the storage devices 106, with the mapping of the abstracted logical address space to the physical address spaces being adjustable.

Aggregator control circuitry 114 also controls a selective computation of metadata that defines content characteristics of media objects that are retrieved from storage devices 106 or that are received from the one or more hosts 102 over computer network 108 for storage in storage devices 106. In some aspects, aggregator control circuitry 114 is configured to control an order by which media objects are retrieved from storage devices 106 and processed to compute metadata.

In embodiments, aggregator control circuitry 114 is also configured to control whether the metadata is computed by aggregator control circuitry 114 of the aggregator controller 104 itself, by the storage device controller 126 of any one storage device 106 in an aggregated storage array or by a combination of aggregator control circuitry 114 of storage aggregator controller 104 and storage device controller 126 of storage devices 106. In an embodiment, such decisions are made, for example, based on current storage or retrieval operations being performed by the various storage devices 106 and the storage aggregator controller 106, respectively, in an effort to balance processing loads among controllers of the aggregated storage devices 106 usage of respective compute resources that are available at a particular time in the system 100. In some embodiments, such decisions are made based on the amounts and/or locations of storage space (e.g., contiguous storage locations) that are available in the various storage devices 106 and that are needed for storage of specific items of related metadata, in an effort to balance the usage of storage space and/or to store related items of metadata in a consolidated manner.

In an example, data is retrieved from a first storage device 106-1, which is, or is shortly expected to be, busy executing storage and retrieval operations, and the data is provided to a second storage device 106-2, that is currently idle from storage operations. In such an example, based on the data retrieved from the first storage device 106-1, the second storage device 106-2 performs metadata generation operations, concurrently with the storage and retrieval operations being performed at the first storage device 106-1, and also serves as a storage location for the generated metadata. Similarly, in some systems specific ones of the storage device controllers 126 of storage devices 106 are configured to specialize in designated types of processing, for instance DSP and vector processing, such that unstructured media requiring a specific type of analysis most suitably performed by a general processor, or a DSP or a vector processor, are provided to a most suitable available processor in the aggregated storage system 100. In this regard, in some examples, the aggregator control circuitry 114 and/or different ones of the storage device controllers 126 have one or more DSP blocks, GPU blocks, or other types of processor blocks.

In some examples, aggregator control circuitry 114 is configured to cause (e.g., command or request) storage device controller 126 of a storage device 106 to compute metadata with respect to a segment of a media object that is stored in the storage device 106. Storage aggregator controller 104 operates at a higher layer than individual storage devices 106 themselves. For instance, in some aspects, storage aggregator controller 104 divides data, such as unstructured or partially structured media objects, into parts, with parts of the objects being stored in different storage devices 106-1, 106-2, 106-3. To that end, storage aggregator controller 104 controls how data, such as media objects, are divided up for storage among its array of storage devices 106, how objects are retrieved from storage devices 106, and an order by which retrieved data is processed for metadata computation. As noted, storage aggregator controller 104 also controls storage and retrieval of data corresponding to the media objects from controlled storage devices 106 of its choice. Alternatively, storage aggregator controller 104 controls a processor or other type of storage device controller 126 of a connected storage device 106 of its choice to compute metadata with respect to the part of the object stored at that storage device 106.

Storage devices 106 include, in various embodiments, any type and any combination of suitable non-volatile storage, such as a solid-state drive (SSD), a hard disk drive (HDD), flash storage, and/or the like. Each of the storage devices 106 includes a respective storage device memory 124, storage device controller 126, storage device AI engine 128, aggregator interface 132, and storage device non-volatile memory 134, each of which being communicatively coupled to one another via storage device control/data buses 130.

Figure 2:
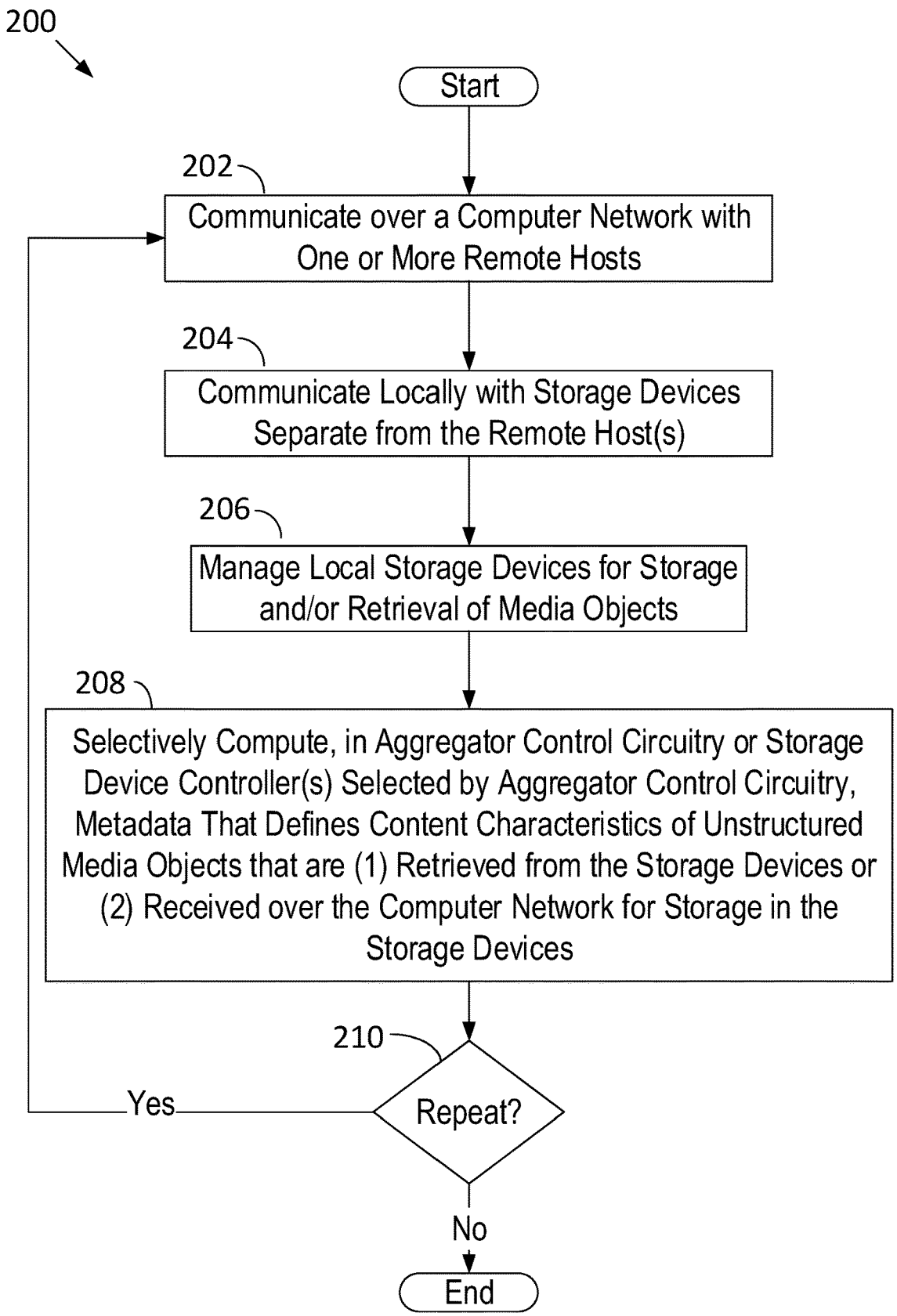
FIG. 2 is a flow diagram of a method for controlling metadata computation using a storage aggregator controller, in accordance with embodiments of the subject matter of this disclosure.

FIG. 2 is a flow diagram of method 200 for controlling metadata computation using storage aggregator controller 104, in accordance with embodiments of the subject matter of this disclosure. In various embodiments, metadata generation is triggered in different ways, for instance, by receipt at storage aggregator controller 104 of a metadata generation command from host system 102, or by a generic background task that the storage aggregator controller 104 is configured to execute, and/or the like. At 202, aggregator control circuitry 114 uses host interface 120 to communicate over computer network 108 with one or more of host systems 102, for example to receive data, such as media objects, from host systems 102 to be stored in one or more of storage devices 106. Alternatively, aggregator control circuitry 114 receives, from one or more of host systems 102 via network 108 and host interface 120, instructions to compute metadata for previously stored unstructured media objects, or partially structured media objects.

At 204, aggregator control circuitry 114 uses storage interface 122 to communicate locally with storage devices 106, for example, to store data or media objects received from host systems 102 in storage devices 106. In an example, aggregator control circuitry 114 coordinates the storage of data or media objects by using an abstracted logical address space that presents to hosts 102 a unified address space for the aggregated storage devices 106.

At 206, aggregator control circuitry 114 manages local storage devices 106 to perform storage and/or retrieval operations of media objects received from host systems 102.

At 208, aggregator control circuitry 114 causes metadata to be computed for unstructured data that is received from remote hosts for storage in system 100, or that is retrieved from storage in one or more of storage devices 106 in system 100. Storage aggregator controller 104 selectively computes metadata using compute resources that it has available either in its own aggregator control circuitry 114 or at the storage device controller 126 of one or more storage devices 106-1, 106-2, 106-3 in the aggregated system 100. The computation of metadata defines content characteristics of unstructured media objects that are to be stored in one or more storage devices 106, in an embodiment. Additional details of illustrative methods for computing metadata are provided in the context of FIG. 3 and FIG. 4. The generation of metadata is a multistep process that is repeated until completion. In the event, for example, that no further communication is occurring between host systems 102 and storage aggregator controller 104 ("No" at 210), then method 200 terminates. If, on the other hand, additional communication continues between host systems 102 and storage aggregator controller 104 ("Yes" at 210), control passes back to 202 and aggregator control circuitry 114 continues to communicate with host systems 102 in the manner described above, for example to receive more data for storage in storage devices 106 and/or for metadata computation.

In some embodiments, as noted above, storage aggregator controller 104 (or more specifically, aggregator control circuitry 114) is operative to perform metadata computation during times when storage aggregator controller 104 is idle from operations related to communicating with host systems 102 over computer network 108 and/or idle from operations related to managing storage or retrieval of any data at one or more of the aggregated local storage devices 106. In such embodiments, for example, at 210, aggregator control circuitry 114 determines whether storage device controller 126 of a specific storage device 106 is idle from operations, such as reading and writing to non-volatile memory, and thus is available to compute additional metadata or is busy performing such storage related operations and thus should cease or temporarily pause computation of metadata. In this regard, for example, should aggregator control circuitry 114 of the storage aggregator controller 104 determine that a storage device controller 126 resource of a first storage device 106-1 is required to perform a storage operation, for instance because new data is received from host 102 over the computer network 108 for storage in storage device 106-1, metadata computation is paused at the first storage device 106-1 and the computation of the metadata is passed to storage device controller 126 of a second storage device 106-2 in order not to interrupt storage of the newly incoming data. Conversely, storage aggregator controller 104 can determine, in the alternative, that newly received data is to be stored at a storage device 106-3 whose control circuitry 126 is presently idle from performing metadata computations.

In embodiments, a suitable shared memory, buffer, or cache (for instance, as part of aggregator memory 112) may be needed to store those portions of the unstructured media on which metadata is being calculated so that if calculation can be seamlessly transferred to the storage device controllers 126 of a different storage device 106 in the aggregated system 100.

In an example, aggregator control circuitry 114 receives a read instruction or a write instruction from the one or more hosts 102 over computer network 108 and, in response, pauses metadata computation by aggregator control circuitry 114 of storage aggregator controller 104 and/or by storage device controller 126 of one or more of storage devices 106. In embodiments, aggregator control circuitry 114 makes similar determinations as part of step 308 and/or step 410 of FIG. 3 and FIG. 4, respectively, described below.

In other embodiments, storage aggregator controller 104 triggers the computation of metadata by retrieving media objects that have already been stored in one or more of storage devices 106. Additionally, in some embodiments, storage or retrieval of media objects is executed in parallel (for example, by aggregator control circuitry 114 and/or storage device controller 126, implementing aggregator AI engine 116 and/or storage device AI engine 128, respectively), thereby speeding up metadata generation, or the computation is done on a media object that has been retrieved in segments. Some parts of the metadata computations are done at the storage device 106 level on a segment-by-segment basis, in an embodiment, and then the storage aggregator controller 104 (or aggregator control circuitry 114) combines or stitches together the portions of computed metadata, which it then stores, for instance, separately retrievable from the segments of media objects. Aggregator control circuitry 114 stores computed metadata in separate segments distributed among storage devices 106, in some instances. Alternatively, control circuitry 104 retrieves a media object from different storage devices 106 on a segment-by-segment basis, with computation of the metadata being executed independently by aggregator control circuitry 114 on the retrieved segments of the media object or on the entirety of the media object (for example, a combination of the retrieved segments).

Figure 3:
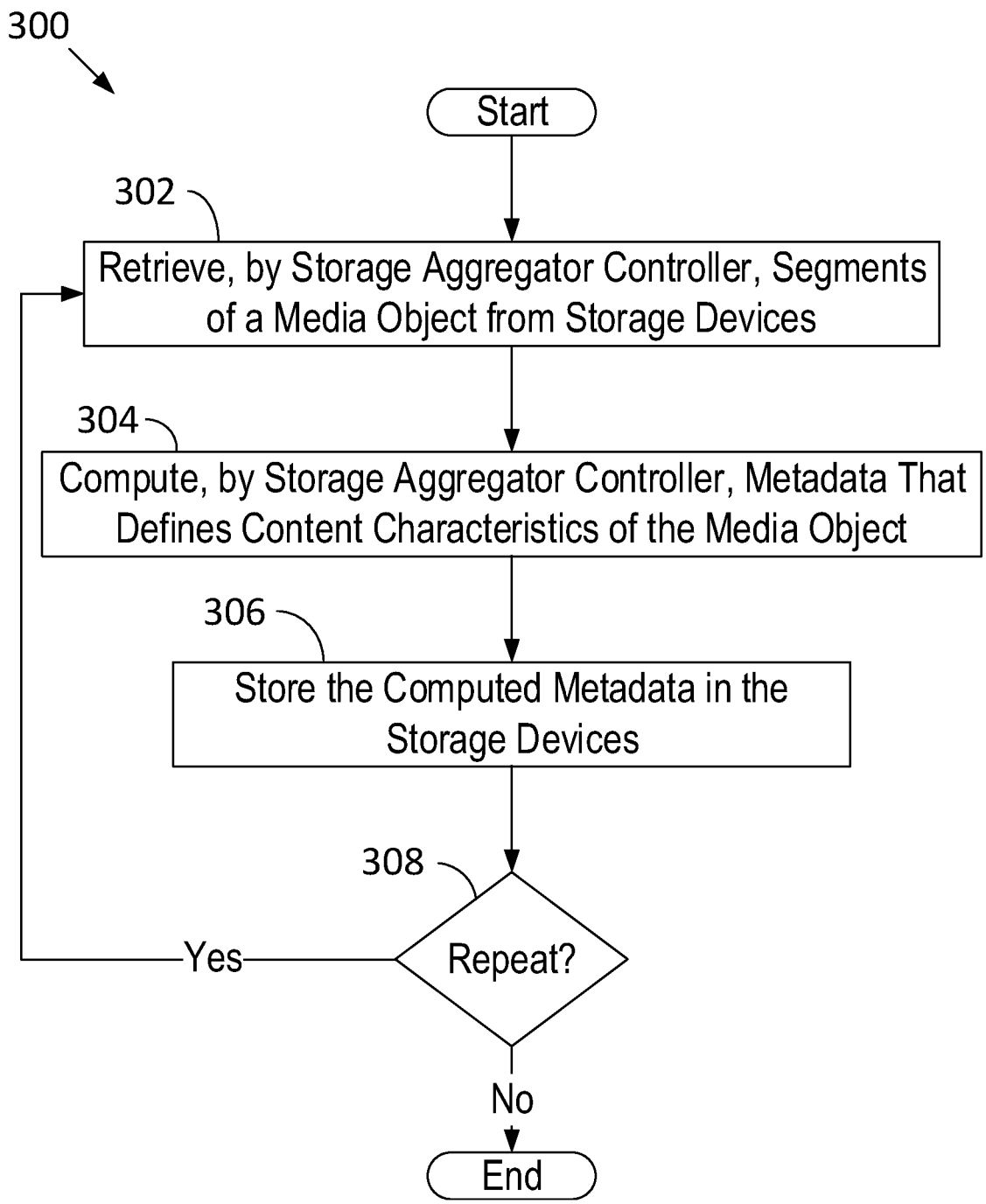
FIG. 3 is a flow diagram of another method for controlling metadata computation using a storage aggregator controller, in accordance with other embodiments of the subject matter of this disclosure.

FIG. 3 is a flow diagram of method 300 for using storage aggregator controller 104 to control the metadata computation based upon data stored in storage devices 106, in accordance with embodiments of the subject matter of this disclosure. At 302, aggregator control circuitry 114 retrieves segments of a media object that have been stored in storage devices 106.

At 304, aggregator control circuitry 114 of the storage aggregator controller 104 computes metadata that defines characteristics of the media object. Alternatively, aggregator control circuitry 114 assigns computation of metadata to storage device controller 126 of one or more of the storage devices 106.

At 306, aggregator control circuitry 114 stores the metadata that had been computed at 304 in one or more of storage devices 106 of the aggregated system 100. Once no further data that had been stored in storage devices 106 requires metadata computation ("No" at 308), then method 300 terminates. If, on the other hand, unstructured or partially structured media data requiring metadata computation remains ("Yes" at 308), then control passes back to 302. In an embodiment, aggregator control circuitry 114 causes additional segments of a media object to be retrieved from one or more of storage devices 106 for further computation of metadata in the manner described above.

Figure 4:
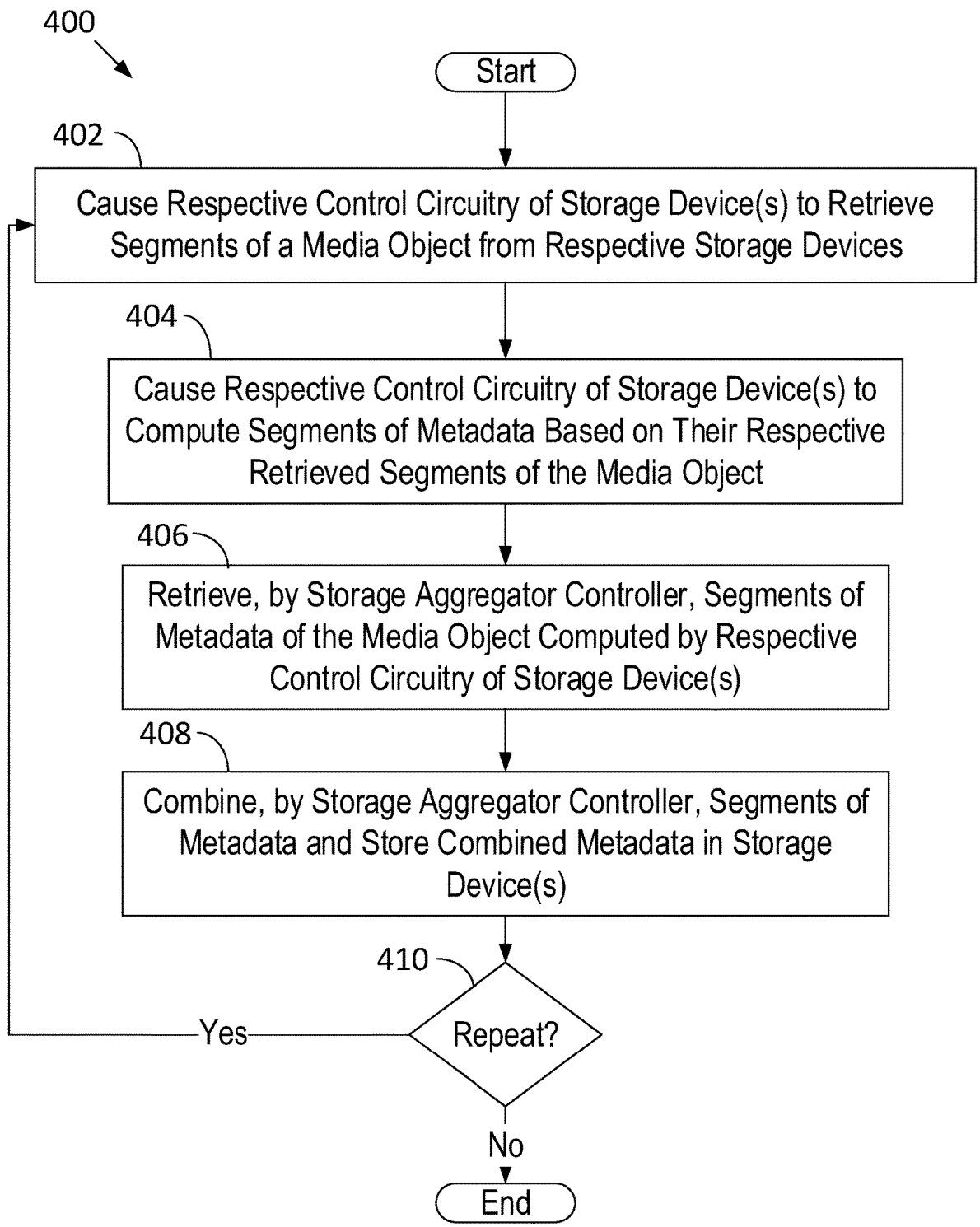
FIG. 4 is a flow diagram of still another method for controlling metadata computation using a storage aggregator controller, in accordance with still other embodiments of the subject matter of this disclosure.

FIG. 4 is a flow diagram of method 400 for controlling metadata computation using storage aggregator controller 104, in accordance with embodiments of the subject matter of this disclosure where unstructured data, for example a video, is divided into segments that are distributed among several of the aggregated storage devices 106-1, 106-2, 106-3. At 402, aggregator control circuitry 114 of storage aggregator controller 104 causes (e.g., commands or requests) respective storage device controller 126 of storage devices 106 to retrieve segments of an unstructured media object that is stored in a distributed manner among the respective storage devices 106.

At 404, aggregator control circuitry 114 causes (e.g., commands or requests) respective storage device controller 126 of storage devices 106 to compute segments of metadata based on their respective retrieved segments of the unstructured media object data.

At 406, aggregator control circuitry 114 retrieves from storage devices 106 the segments of metadata of the unstructured media object data that were computed by respective storage device controller 126 of storage devices 106.

At 408, aggregator control circuitry 114 combines the segments of the metadata retrieved at 406 for the media object and stores the combined metadata in one or more storage devices 106, for example, in association with the media object. In embodiments, aggregator control circuitry 114 at 408 stitches together the pieces of metadata and maintains association (for instance, by linking pointers in the abstraction layer of the aggregated storage) between the metadata segments and corresponding objects in the structured media. Aggregator control circuitry 114, in some aspects, causes the metadata to be stored in a manner that, although associated with raw data objects, enables its being retrieved separately from the raw data. In this way, metadata can be supplied to a host 102 without the media, but the metadata can be used to identify relevant portions of the media and then separately retrieve the relevant portions. Put differently, the functionalities of aggregator control circuitry 114, in embodiments, are performed at and within a specific aggregator 104 and its respective storage devices 106-1, 106-2, 106-3, without engaging processors of hosts 102 over computer network 108 to compute the metadata or to stitch the metadata portions into a single metadata.

If no further data stored in storage devices 106 requires metadata computation ("No" at 410), then method 400 terminates. If, on the other hand, storage devices 106 contain data requiring metadata computation ("Yes" at 410), then control passes back to 402 at which aggregator control circuitry 114 of storage aggregator controller 104 causes (e.g., commands or requests) respective storage device controller 126 of storage devices 106 to retrieve additional segments of media objects stored in their respective storage devices 106 for corresponding metadata computation in the manner described above.

Various embodiments discussed in conjunction with FIGS. 1-4 are performed by control circuitry or various electronic components of one or more electronic circuits, such as but not limited to an integrated circuit, application-specific integrated circuit (ASIC), Field Programmable Gate Array (FPGA), and/or other like circuitry. In addition, or alternatively, various embodiments and components disclosed herein are configured to be at least partially operated and/or implemented by processor-executable instructions, for example firmware instructions, that are stored on one or more transitory or non-transitory processor-readable media in aggregator non-transitory memory 121.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein are employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

Other variations are within the scope of the following claims.

What is claimed is:

1. A storage aggregator controller, comprising:
   a host interface configured to communicate over a computer network with one or more remote hosts;
   a storage device interface, configured to communicate locally with a plurality of local storage devices, separate from the one or more remote hosts, the storage devices comprising respective non-volatile memories and respective storage device controllers; and
   aggregator control circuitry, configured to:
      manage the plurality of local storage devices for storage or retrieval of media objects, the plurality of storage devices coupled to the storage device interface;
      present to the one or more remote hosts an abstracted logical address space that is mapped to a combination of physical address spaces of the plurality of storage devices, wherein the mapping of the abstracted logical address space to the physical address spaces is adjustable;
      control an order by which media objects are retrieved from the plurality of storage devices and processed to compute metadata;
      identify a first component of one or more components for computing metadata that is presently not busy executing a storage related read operation or write operation;
      select the first component for computing metadata;
      based on a result of the selecting, govern a computation, at the first component, of metadata that defines content characteristics of the media objects that are retrieved from the plurality of storage devices or that are received from the one or more hosts over the computer network for storage in the plurality of storage devices; and
      in response to determining, during the metadata computation at the first component, that the first component is required to perform a storage operation:
         select a second component for continuing to compute the metadata, the second component being presently not busy executing a storage related read operation or write operation and being selected from the group of components; and pass the metadata computation to the second component in order not to interrupt storage of data by the first component.

2. The storage aggregator controller of claim 1, wherein the aggregator control circuitry is further configured to selectively control whether the metadata is computed by the storage device controller of any single storage device, by the storage device controllers of a plurality of the storage devices, or by a combination of the aggregator control circuitry and the storage device controllers of one or more storage devices.

3. The storage aggregator controller of claim 1, wherein the aggregator control circuitry is further configured to cause the storage device controller of a specific storage device, from among the plurality of storage devices, to compute metadata with respect to a segment of a media object that is stored in the specific storage device.

4. The storage aggregator controller of claim 1, wherein the aggregator control circuitry is further configured to apportion a processing load for computing metadata of media objects among the aggregator control circuitry and the storage device controllers of one or more of the plurality of storage devices.

5. The storage aggregator controller of claim 1, wherein a media object is stored in segments distributed among respective ones of the plurality of storage devices, the aggregator control circuitry being further configured to:

cause a plurality of the storage device controllers of the plurality of storage devices, respectively, to compute portions of metadata for the segments of the media object that are stored locally at the respective storage device, and store the portions of computed metadata at the respective storage device;

obtain the computed portions of metadata from the plurality of storage devices; and combine the computed portions of metadata into combined metadata corresponding to the media object.

6. The storage aggregator controller of claim 1, wherein the aggregator control circuitry is further configured to:

retrieve segments of a media object from separate storage devices from among the plurality of storage devices that are aggregated by the storage aggregator controller; and compute metadata for the retrieved segments of the media object.

7. The storage aggregator controller of claim 1, wherein the aggregator control circuitry is further configured to cause computed metadata to be stored in separate segments distributed among the plurality of storage devices.

8. The storage aggregator controller of claim 1, wherein the aggregator control circuitry is further configured to:

receive a read instruction or a write instruction from the one or more hosts over the computer network; and in response to the receiving, pause metadata computation at one or more of the aggregator control circuitry and storage device controller to which the read or write instruction is targeted, and continue metadata computation at least at the aggregator control circuitry or at a storage controller that is controlled by the aggregator control circuitry and that is idle from performing any read or write instructions.

9. The storage aggregator controller of claim 1, wherein the aggregator control circuitry is further configured to:

determine whether the aggregator control circuitry or the one or more storage device controllers is at least partly idle from performing storage operations; and cause a toggling between computing metadata at the aggregator control circuitry and computing metadata at the one or more of the storage device controllers based on which of the aggregator control circuitry and the one or more of the storage device controllers is at least partly idle from performing storage operations.

10. The storage aggregator controller of claim 9, wherein the aggregator control circuitry is further configured to:

select as the component for computing metadata, from the group of components consisting of the aggregator control circuitry and the one or more storage device controllers, the aggregator control circuitry or the one or more of the storage device controllers based on at least one of a type of processing to be performed and an availability of a resource for performing the metadata computation.

11. A method for managing local storage devices and metadata computation, comprising:

communicating, via a host interface, over a computer network with one or more remote hosts;

communicating, via a storage device interface, locally with a plurality of local storage devices, separate from the one or more remote hosts, the storage devices comprising respective non-volatile memories and respective storage device controllers;

managing the plurality of local storage devices for storage or retrieval of media objects, the plurality of storage devices coupled to the storage device interface;

presenting to the one or more remote hosts an abstracted logical address space that is mapped to a combination of physical address spaces of the plurality of storage devices, wherein the mapping of the abstracted logical address space to the physical address spaces is adjustable;

controlling an order by which media objects are retrieved from the plurality of storage devices and processed to compute metadata;

identifying a first component of one or more components for computing metadata that is presently not busy executing a storage related read operation or write operation;

selecting the first component for computing metadata;

based on a result of the selecting, governing a computation, at the first component, of metadata that defines content characteristics of the media objects that are retrieved from the plurality of storage devices or that are received from the one or more hosts over the computer network for storage in the plurality of storage devices; and in response to determining, during the metadata computation at the first component, that the first component is required to perform a storage operation:

selecting a second component for continuing to compute the metadata, the second component being presently not busy executing a storage related read operation or write operation and being selected from the group of components; and passing to metadata computation to the second component in order not to interrupt storage of data by the first component.

12. The method of claim 11, further comprising selectively controlling whether the metadata is computed by the storage device controller of any single storage device, by the storage device controllers of a plurality of the storage devices, or by a combination of the aggregator control circuitry and the storage device controllers of one or more of the storage devices.

13. The method of claim 11, further comprising causing the storage device controller of a specific storage device, from among the plurality of storage devices, to compute metadata with respect to a segment of a media object that is stored in the specific storage device.

14. The method of claim 11, further comprising apportioning a processing load for computing metadata of media objects among the aggregator control circuitry and the storage device controllers of one or more of the plurality of storage devices.

15. The method of claim 11, wherein a media object is stored in segments distributed among respective ones of the plurality of storage devices, and the method further comprises:
   causing a plurality of the storage device controllers of the plurality of storage devices, respectively, to compute portions of metadata for the segments of the media object that are stored locally at the respective storage device, and store the portions of computed metadata at the respective storage device;
   obtaining the computed portions of metadata from the plurality of storage devices; and
   combining the computed portions of metadata into combined metadata corresponding to the media object.

16. The method of claim 11, further comprising:
   retrieving segments of a media object from separate storage devices from among the plurality of storage devices that are aggregated by the storage aggregator controller; and
   computing metadata for the retrieved segments of the media object.

17. The method of claim 11, further comprising causing computed metadata to be stored in separate segments distributed among the plurality of storage devices.

18. The method of claim 11, further comprising:
   receiving a read instruction or a write instruction from the one or more hosts over the computer network; and
   in response to the receiving, pausing metadata computation at one or more of the aggregator control circuitry and storage device controller to which the read or write instruction is targeted, and continuing metadata computation at least at the aggregator control circuitry or at a storage controller that is controlled by the aggregator control circuitry and that is idle from performing any read or write instructions.

19. The method of claim 11, further comprising:
   determining whether the aggregator control circuitry or the one or more of the storage device controllers is at least partly idle from performing storage operations; and
   causing a toggling between computing metadata at the aggregator control circuitry and computing metadata at the one or more of the storage controller controllers based on which of the aggregator control circuitry and the one or more of the storage device controllers is at least partly idle from performing storage operations.

20. The method of claim 19, further comprising:
   selecting as the component for computing metadata, from the group of components consisting of the aggregator control circuitry and the one or more storage device controllers, the aggregator control circuitry or the one or more of the storage device controllers based on at least one of a type of processing to be performed and an availability of a resource for performing the metadata computation.

* * * * *